Jan. 1, 1957 L. J. STOYANOFF 2,775,827
DEVICE FOR READING TRAINING
Filed May 23, 1951 2 Sheets-Sheet 1

INVENTOR.
LOUIS J. STOYANOFF
BY
ATTORNEY

Jan. 1, 1957  L. J. STOYANOFF  2,775,827
DEVICE FOR READING TRAINING
Filed May 23, 1951  2 Sheets-Sheet 2
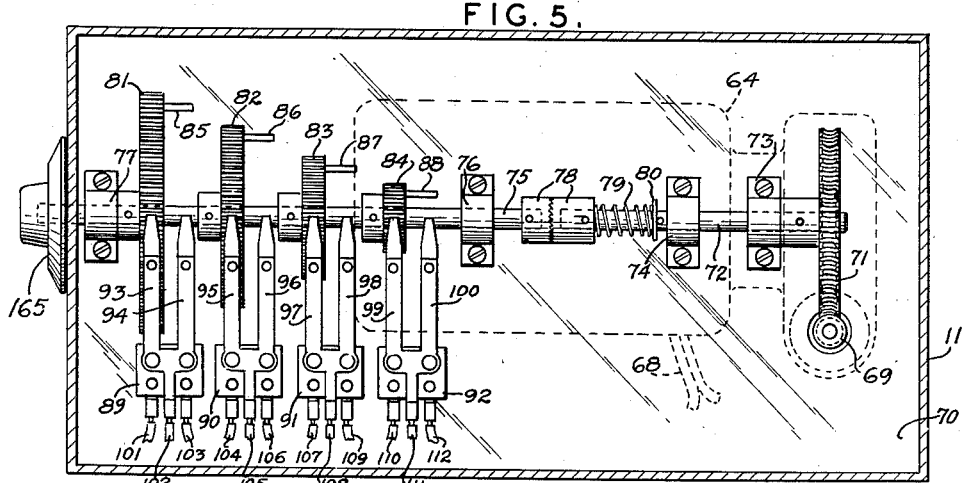
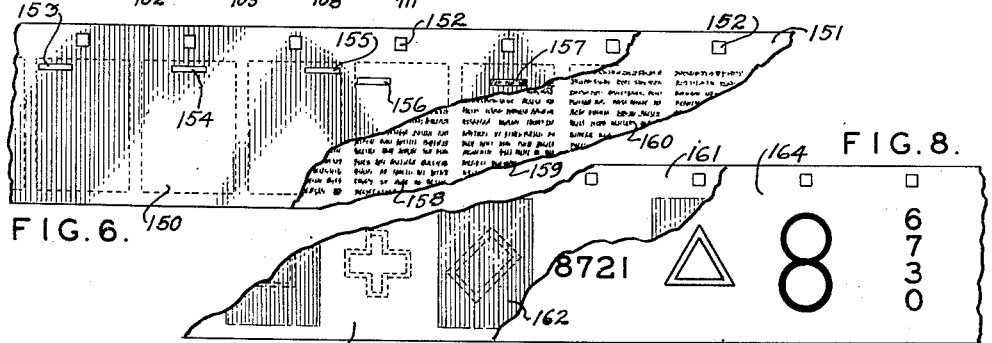
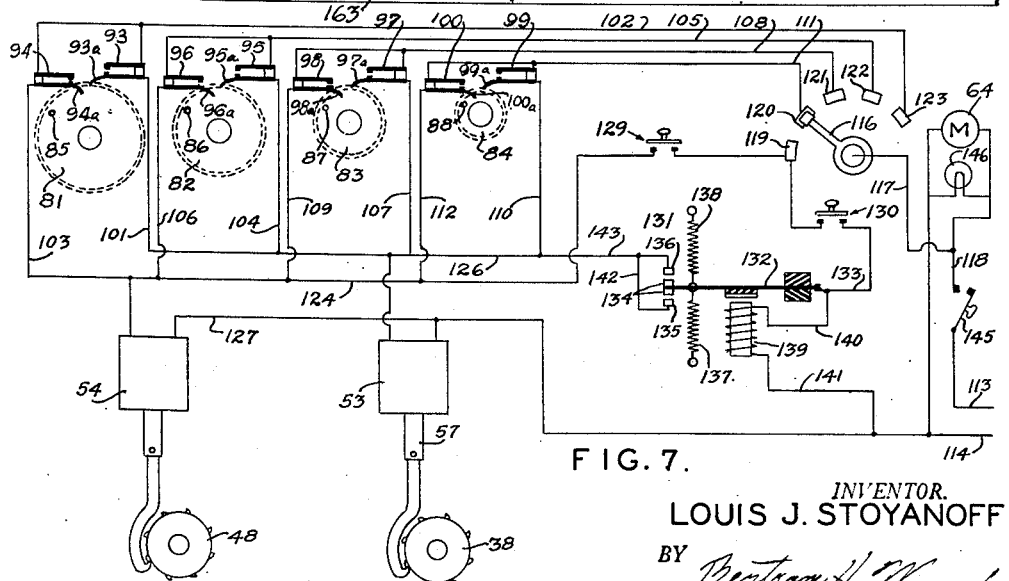
INVENTOR.
LOUIS J. STOYANOFF
ATTORNEY

United States Patent Office

2,775,827
Patented Jan. 1, 1957

2,775,827
DEVICE FOR READING TRAINING

Louis J. Stoyanoff, St. Louis, Mo., assignor to Perceptual Development Laboratories, Inc., a corporation of Missouri Application May 23, 1951, Serial No. 227,771

7 Claims. (Cl. 35—35)

This invention relates to an instrument for use in training persons to read rapidly.

Various devices have been known for stimulating a reader to move his eyes rapidly along a page of reading matter and the use of these, followed by perception tests, have proven successful in training persons to read rapidly. However, such devices have been of limited use and flexibility, or have been rather expensive so that their wide use has been prevented.

The main object of the present invention is to provide a device for rapid reading training which may be used without the necessity of substantial expense for equipment and which is sufficiently flexible in use to justify its widespread adoption by persons and institutions interested in training people to read rapidly.

Another object is to provide an instrument as above which may be manufactured relatively inexpensively, yet is extremely flexible in use.

These objects and other more detailed objects hereafter appearing are attained by the device illustrated in the accompanying drawings in which:

Fig. 5 is a top view of the control box with the top portion of its casing removed.

Fig. 6 is an enlarged view showing portions of a set of films for use with the device.

Fig. 7 is a wiring diagram of the device.

Fig. 8 shows a different set of films for use with the tachistoscopic feature of the invention.

Figures 1, 2, 3, 4:
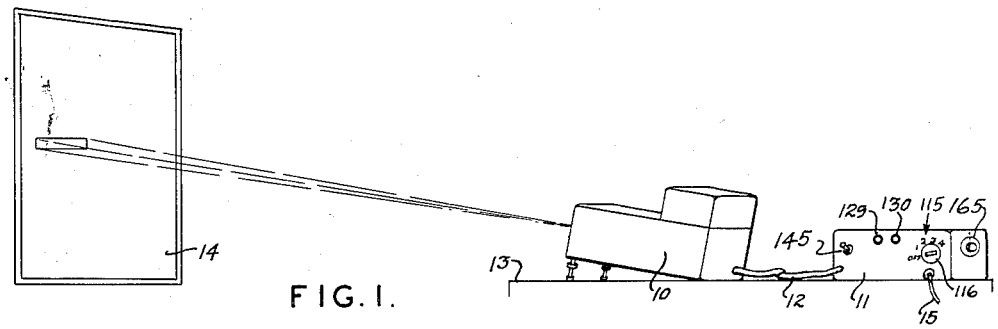
Fig. 1 is a somewhat diagrammatic, perspective view illustrating the manner of practicing the use of the device.
Fig. 2 is a top view of the projector with its cover removed.
Fig. 3 is a vertical, transverse section taken on line 3—3 of Fig. 2.
Fig. 4 is a similar section taken on line 4—4 of Fig. 2.

Figure 1 shows the case 10 of the novel film projector and the control box 11 connected to the projector by an electrical cable 12 and mounted on a table 13 so as to project an image upon a screen 14. A cord 15 leads from the control box for connection to a source of electrical energy.

The projector, as shown in Figs. 2, 3, and 4, and the diagram, Fig. 7, comprises a base plate 17 upon which is mounted a projector lamp casing 18 of any suitable form and having current supply wires 19. In front of the projector lamp is a film feeding and guiding structure including an upright plate 20 mounted by means of flanges 21 upon the base plate. An adjustable lens mount 23 is pivotally mounted on plate 20 opposite lamp casing 18, by means of pivot elements 24, and a latch 25 is provided to maintain the mount in normal, projecting position. A pair of film guides 26 and 27 are secured on opposite sides of the upper portion of plate 20 and provided with central apertures 28 and 29 which register with a central aperture in plate 20 in line with the axis of the lamp. Curved, film guide projections are provided, as at 30 and 31 at the ends of the guides.

On the lamp side of plate 20, a vertical bearing sleeve 33, secured to the plate by a flange 34, journals a shaft 35 having rigid therewith at its upper extremity a pair of collars, the upper designated 36 being toothed, forms a film driving wheel. At the lower end of shaft 35 there is secured a toothed wheel or cog 38 which projects through an opening 39 in plate 20. A film guide roller 41 is pivotally supported adjacent the opposite end of film guide 27, upon an S shaft 42, a leaf spring 43 being provided to hold the roller in its film guiding position.

On the opposite side of plate 20 there is provided a bearing sleeve 45 which journals a vertical shaft 46 having at its upper extremity a toothed wheel 47 and at its lower end a toothed wheel or cog 48 projecting into an opening 49 near the bottom of plate 20. A film guiding roller 50 is pivotally mounted adjacent guide 26, opposite toothed wheel 47 upon an S shaft 51 and with a leaf spring 52.

Mounted on base plate 17 at some distance from plate 20 are a pair of solenoids 53 and 54 having wiring 55 and 56. The armatures of these solenoids have one-way clutch connections to film driving, toothed wheels 36 and 47. Each of these transmission mechanisms consists of an extension 57 from the solenoid core which is connected by a link 58 to a ring 59 loosely received about bearing sleeve 33 just above toothed wheel 38 (Figs. 3 and 4). An outward lug 60, secured rigidly to the underside of link 58, pivotally mounts a detent 61 normally urged into engagement with the periphery of toothed wheel 38, but which may yield on the outward stroke of the solenoid core to pass over a tooth. Thus, upon each inward stroke of the solenoid core, toothed wheel or cog 38 is rotated a fixed amount, causing film drive wheel 36 also to rotate and to draw a film meshed therewith one frame along the film guide. Since both film feed mechanisms are identical, that connecting solenoid 54 to toothed wheel 48 and film feeding cog 47 will not be described in detail.

Within the control box 11 there is mounted an electric motor 64 having electric wiring 68 for supplying energy thereto. The motor is connected to a vertical worm 69 leading through an intermediate, horizontal panel 70 within the box, and meshing with a worm wheel 71 rigid with the end of a shaft 72 mounted in bearings 73 and 74 on panel 70. Shaft 72 is aligned with a shaft 75 mounted in bearings 76 and 77 and is connected thereto by toothed clutch elements 78 normally yieldingly held in operative engagement by a coiled spring 79 abutting a collar 80 on shaft 72.

A series of toothed wheels, 81, 82, 83, and 84 are rigidly secured to shaft 75 at regular intervals therealong and these toothed wheels have at their peripheries lateral pins 85, 86, 87, and 88. A series of insulator blocks 89, 90, 91, and 92 are mounted on panel 70 adjacent these toothed wheels and each carries a pair of normally open, circuit breaker switches 93 and 94, 95 and 96, 97 and 98, and 99 and 100. Wiring leads are connected to the circuit breakers, as indicated by reference numerals 101—112, inclusive. Each center lead 102, 105, 108, and 111, is connected to both upper points of the associated switch. The two outer leads on each block connect, respectively, to the bottom points of the corresponding circuit breakers.

As shown on the diagrammatic view, Fig. 7, one of each pair of circuit breakers, namely, those designated 94, 96, 98, and 100 is offset laterally from the associated toothed wheel and has a depending lip, 94a, 96a, 98a and 100a, for cooperating with the lateral pins projecting from the peripheries of the toothed wheels, to close these switch circuit breakers once during each revolution of the associated toothed wheel. The other breaker of each pair, namely, those designated 93, 95, 97, and 99, has a depending lip 93a, 95a, 97a, and 99a which is actuated by the teeth of the associated toothed wheel to intermittently close the corresponding switches 93, 95, 97 and 99. A hand controller 115 has a rotating arm 116 connected by wires 117 and 118 to a power terminal 113 and this controller also has stationary points 119, 120, 121, 122 and 123, the last four being connected by wires 102, 105, 108, and 111 to the bridged upper points of the respective pairs of circuit breakers. Breaker lead wires 103, 106, 109, and 112 connect via a cross wire 124 to solenoid 54 so that this solenoid is controlled by breakers 94, 96, 98, and 100 in parallel. The other breaker leads 101, 104, 107, and 110 are connected by a cross wire 126 to solenoid 53 so that breakers 93, 95, 97, and 99 control this solenoid. The other terminal of each solenoid is connected by means of a common wire 127 to main power terminal 114.

The fifth terminal 119 of controller 115 is connected by branch circuits through a pair of push button switches 129 and 130, selectively, directly to solenoid 54 and, through a double acting relay 131, to the other solenoid 53. This double acting relay consists of a flexible arm 132, connected by wire 133 to push button switch 130, contacts 134 on arm 132, and upper and lower points 135 and 136. Contacts 134 are normally resiliently held between the upper and lower points by means of oppositely stressed, coiled springs 137 and 138. Magnetic actuating coil 139 of the relay is connected by a wire 140 and lead 133 to push button switch 130 and to power terminal 114 by wires 141 and 127. Relay points 135 and 136 are bridged, as at 142, and connect through wires 143 and 126 to solenoid 53. This double acting relay is of such character that upon a single, brief impulse produced by momentary closing of push button switch 130, relay terminal 134 first will be drawn downwardly against terminal 135 then, upon opening of pushbutton 130, reaction of coil spring 138 will cause the relay arm to be drawn upwardly against upper point 136. Accordingly, two electrical impulses will be applied to solenoid 53 so as to energize the same and produce successive operations thereof.

A master switch 145 is connected in branch power circuit 118 which connects through lead 117 to controller 115, as explained, and also which supplies projector lamp 146 and motor 64.

Figure 6 shows a fixation film strip 150 and a text strip 151 in overlapping, closely juxtaposed relationship, as they are presented by the film guides for projection. Along the upper edge of both strips are apertures 152 for cooperation, respectively, with toothed film feeding cogs 36 and 47. The films may be of the moving picture or slide type. The fixation strip is shaded except for the transparent windows 153, 154, 155 etc., which are located, serially, in the upper left hand corner of the first frame shown, along the center, upper edge of the second frame, and in the upper, right hand corner of the third frame. The next three frames have transparent windows 156, 157, etc., again progressing from left to right, as in the case of the windows in the first three frames, but slightly lower than the latter. Thus, the windows in the fixation film are arranged in echelon fashion simulating the progression of the eye in reading a page of text.

The text film has a series of frames, as at 158, 159, 160, etc., all of which are photographically filled or occupied by reading matter. I have found it desirable to provide 13 lines of text material on each frame. Of course, the material may represent a continuous text. Consequently, fixation film 150 will have enough frames to provide for scanning each line of text on a frame. Since the text film 151 is shifted upon actuation of solenoid 54, such shifting occurs only once during a cycle of the particular toothed wheel 81, 82, 83, or 84 which is at the moment in operation. Obviously, the position of controller arm 116 will determine which one of the toothed wheels is in operation, at the time, to control solenoids 53 and 54 and the matched film.

In order to provide for scanning of the text material at different rates, so as to increase the reading rate, the different sized wheels 81, 82, 83, and 84 are provided. These have, respectively, forty, twenty-seven, fourteen, and eight teeth so that when wheel 81 is in operation, for instance, forty frames of fixation film will be shifted to the projecting position for each single frame shifting of the text film. Three successive images of each text line will be projected and one shift of both films occurs together. When toothed wheel 82 becomes the effective control, there will be two image projections per line, and wheel 83 will produce one image projection per line. These changes, of course, will necessitate different fixation films, with transparent windows, each arranged to expose a half line or a whole line of text material. The smallest wheel 84 may be utilized to expose two full lines of text material. The motor, preferably, is of the variable speed type and a conventional rheostat may be provided so that the rate of movement of the fixation film may be further varied.

Fig. 8 shows a set of matching films which are used in connection with the tachistoscopic feature of the instrument. Fixation film 161, which is operated by toothed feeding wheel 36 and solenoid 53 has alternate opaque and clear frames 162 and 163. The text or image film strip 164, which is actuated by film feeding cog 47 and solenoid 54, may have in each frame a variety of intelligible characters, such as the series of numbers, the concentric triangles, etc. In this operation, button 130 is pushed momentarily to cause the fixation film to move two frames past the single, center frame of the text film, thus briefly exposing the centered image on the text film. As desired, the text film may be shifted one frame at a time by actuation of push button 129.

To aid in initially setting the mechanism for starting, a handle knob 165 is provided on shaft 75.

Thus, it is necessary to utilize a pair of films in order to practice the rapid reading training, as described above, but the substitution of fixation and text films, which are relatively inexpensive, makes the method and equipment exceedingly flexible, inexpensive, and useful. Broadly, the text and fixation films could be separately projected with identical results and with identical mechanisms, except for the duplication of projector lamps and lenses and the inversion of the transparent and opaque areas of the fixation film. In this case, of course, light projected on the common screen through the transparent parts of the fixation film will neutralize the parts of the projected image of the text film, while the opaque parts of the fixation film leave only selected parts of the text image visible. Various features may be modified, as for instance, the specific transmission connection between the film motor and the film feeding cogs and also the relative arrangement of the fixation and text films.

The exclusive use of all modifications as come within the scope of the appended claims is contemplated.

I claim:

1. A reading training device comprising a film projector, film guide means for presenting a pair of films in overlapping relationship for unison projection, a text film and a fixation film in said guide means, said text film having successive frames each containing a plurality of lines of reading matter thereon and said fixation film having successive frames in each of which is included a restricted, transparent window, said windows being arranged in echelon formation along said fixation film strip with the number of steps in the echelon formation corresponding to the number of lines of text on a frame of said text film, a first means operative to feed the fixation film strip step by step relative to said text film thereby to successively expose through said windows sequential portions of the reading matter on a frame of said text film, and a second means synchronized with said first means and operative to feed the text film one frame each time said fixation film has been fed a sufficient number of steps to complete the exposure of a frame of text.

2. A reading training device comprising a film projector including lamp means, a pair of strip film guides arranged to present a pair of film strips in overlapping relationship before the projector for unison projection, a pair of electrically operated film feeding devices each operative upon energization to feed a film strip one frame through one of said guides, and a control system including a variable frequency cycling means operative to effect the delivery of energizing pulses to one of said feeding devices continuously at a predetermined frequency and including means moving in synchrony with said cycling means for effecting the delivery of energizing pulses to the other of said feeding devices intermittently with respect to the continuity of delivery of energizing pulses to said first feeding device.

3. A fixation film strip for reading training to be used for successively exposing for projection sequential portions of a text film which has a plurality of lines of reading matter on each of successive frames thereof, the fixation film strip consisting of successive uniform frames each of which has a restricted, relatively transparent window therein, said restricted windows being arranged in groups with the windows of each group being arranged in horizontal alignment and spaced progressively along the film from the corresponding transverse edges of their respective frames and the groups of windows being arranged in echelon formation so that when the fixation film strip is placed in overlapping relationship with a text film and fed frame by frame unidirectionally with respect thereto, successive portions of each line of text and succesive lines of text will be sequentially exposed, momentarily, for projection, thereby providing sequential fixations which progress on a viewing screen from left to right along a line of text and downwardly from line to line in a manner to correctly train eye movement for rapid reading.

4. A fixation film strip for reading training to be used for successively fixing the reader's eye upon sequential portions of a text film which has a plurality of lines of reading matter thereon, consisting of successive, uniform frames, each of which has a transparent portion and a shaded portion, each shaded portion having a pair of intersecting regions forming, respectively, left and upper marginal parts of said transparent portion, said pairs of intersecting, shaded regions being arranged in groups with the pairs of regions of each group being arranged in horizontal alignment and spaced progressively along the film from the corresponding transverse edges of their respectiive frames and the groups of marginal regions being arranged in echelon formation so that when the fixation film strip is placed in overlapping relationship with a text film and fed frame by frame, unidirectionally with respect thereto, the reader's eye will be successively fixed by said pairs of shaded, marginal regions upon sequential text portions from left to right along each line of text and downwardly from line to line in the manner to correctly train eye movement for rapid reading.

5. In a reading training projector, film guide means for presenting a pair of film strips for simultaneous, overlapping projection upon a viewing screen, a text film strip and a fixation film strip in said guide means, said text film strip consisting of successive frames of text and each containing a plurality of lines of text thereon, and said fixation film strip consisting of successive frames each having a transparent portion and a shaded portion including parts forming left and top margins of said transparent portion, said marginal parts being arranged in echelon formations along the fixation film strip with the number of steps in each echelon formation corresponding to the number of lines of text on a frame of the text film, a first means operative to feed the fixation film strip repetitively frame by frame relative to said text film, and a second means synchronized with said first means and operative to feed the text film one frame each time said fixation film has been fed through an echelon formation.

6. In a reading training projector, a pair of film guides for presenting a pair of film strips for overlapping projection upon a viewing screen, one of which film strips consists of successive frames of text and the other film strip consisting of successive frames having shaded and transparent portions which are arranged along the film strip in a manner to provide successive eye fixations of sequential portions of the text as the fixation film strip is fed step by step relative to the text film, film feeding mechanism including a pair of electrically operated actuators each operative upon energization to effect the feeding of a film strip one frame through one of said guides, and a control system including a first variable frequency switching means operative to energize one of said actuators repetitively at a predetermined frequency, and said control system including a second switching means synchronized with said first switching means for energizing the other of said actuators intermittently with respect to the continuity of repetitive energization of said first-mentioned actuator and simultaneously with an energization of said first actuator.

7. A set of elongated film strips adapted to be projected in overlapping relationship upon a viewing screen, comprising a text film strip having successive frames each simulating a page of text, and a fixation film strip having successive frames each including a transparent portion and a shaded portion. each shaded portion including top and left marginal parts delineating the upper left area of said transparent portion, said marginal parts being arranged in horizontal groups with the marginal parts of each group being differentially spaced horizontally in their respective frames to successively fix the eye on sequential portions of a line of text and prevent regression, and the groups being arranged in echelon formation along said fixation film strip and being equal in number to the lines of text on a frame of said text film, whereby the eye is successively fixed upon sequential portions of the text from left to right across a line of text and from line to line down the page in the normal manner of reading when the film strips are projected in overlapping relationship upon a viewing screen and the fixation film strip is fed frame by frame from left to right with respect to a frame of the text film.

References Cited in the file of this patent

UNITED STATES PATENTS

| | | |
|---|---|---|
| 560,425 | Petit | May 19, 1896 |
| 1,129,693 | Kurre | Feb. 23, 1915 |
| 1,190,370 | Billings | July 11, 1916 |
| 1,364,652 | Sutherland | Jan. 4, 1921 |
| 1,719,756 | Clay | July 2, 1929 |
| 1,879,501 | Riggler | Sept. 27, 1932 |
| 2,206,476 | Damblanc | July 2, 1940 |
| 2,266,798 | Peck | Dec. 23, 1941 |
| 2,357,593 | Leavell | Sept. 5, 1944 |
| 2,503,740 | Jelinek | Apr. 11, 1950 |
| 2,512,256 | O'Connor | June 20, 1950 |
| 2,535,243 | Taylor | Dec. 26, 1950 |

FOREIGN PATENTS

| | | |
|---|---|---|
| 831,425 | France | June 7, 1938 |